United States Patent
Lvovskiy et al.

(10) Patent No.: US 7,629,877 B2
(45) Date of Patent: Dec. 8, 2009

(54) MULTIFUNCTIONAL COLLIMATOR INDICATOR

(76) Inventors: Matvey Lvovskiy, 8750 Bay Pkwy., Apt. #D5, Brooklyn, NY (US) 11214; Simon Iokhvidson, 8750 Bay Pkwy., Apt. #A3, Brooklyn, NY (US) 11214; Mikhail Lvovsky, 328 101 St., Apt. # 36B, Brooklyn, NY (US) 11209; Alexander Efros, Prospect Prosvetcheniya 78, Apt. # 305, Saint Petersburg (RU) 195297

( * ) Notice: Subject to any disclaimer, the term of this patent is extended or adjusted under 35 U.S.C. 154(b) by 0 days.

(21) Appl. No.: 11/641,092

(22) Filed: Dec. 19, 2006

(65) Prior Publication Data

US 2009/0115586 A1    May 7, 2009

(51) Int. Cl.
*B60Q 1/00* (2006.01)

(52) U.S. Cl. .................. 340/438; 340/980; 353/14; 345/7; 359/631

(58) Field of Classification Search ............. 340/438, 340/980; 353/13, 14, 28, 69; 345/7, 8, 9; 359/630, 631, 632
See application file for complete search history.

(56) References Cited

U.S. PATENT DOCUMENTS

| | | | |
|---|---|---|---|
| 4,925,272 A | 5/1990 | Ohshima et al. | |
| 4,961,625 A | 10/1990 | Wood et al. | |
| 5,140,465 A | 8/1992 | Yasui et al. | |
| 5,237,455 A | 8/1993 | Bordo et al. | |
| 5,305,011 A | 4/1994 | Furuya et al. | |
| 5,327,154 A | 7/1994 | Aoki | |
| 5,386,216 A * | 1/1995 | Iino | 345/7 |
| 5,418,651 A | 5/1995 | Iino et al. | |
| 5,497,271 A | 3/1996 | Mulvanny et al. | |
| 5,552,935 A | 9/1996 | Knoll et al. | |
| 5,734,357 A * | 3/1998 | Matsumoto | 345/7 |
| 5,859,714 A | 1/1999 | Nakazawa et al. | |
| 5,867,133 A * | 2/1999 | Toffolo et al. | 345/7 |
| 6,262,848 B1 * | 7/2001 | Anderson et al. | 359/630 |
| 6,443,573 B2 | 9/2002 | Aoki | |
| 6,791,511 B2 | 9/2004 | Eschler | |
| 6,992,578 B2 | 1/2006 | Aoki et al. | |
| 7,347,551 B2 * | 3/2008 | Fergason et al. | 351/210 |

* cited by examiner

*Primary Examiner*—Anh V La

(57) ABSTRACT

The present invention relates to indication systems providing augmented visual support for the operator of a motor vehicle, vessel or an aircraft. The indication system is positioned in the location of a traditional vehicular gauge dashboard. The indication system consists of an image formulator and an optical collimator system with two visual channels. Lower channel is used for direct visual tracking of all virtual gauge readings while the upper channel is used to track updates "on the windshield" of a vehicle with the background of the surrounding environment. The lower channel displays virtual collimator imaging of the traditional analog or digital gauges as well as navigational system data. The upper channel is reflected onto the exterior background of the windshield and displays collimator imaged critical data that is required for the safe operation of a vehicle. To provide the switching functionality between the two channels, the indication system utilizes a lightproof partition. The side of the partition facing the image formulator is designed as a flat reflective mirror. In order to engage the lower channel, the partition is placed away from the optical systems for the lower channel. To provide viewing of the upper channel, the partition is positioned along the optical axis of the upper collimator lens at a given angle. To provide the function of automatic switching between the channels, the multifunctional collimator indicator is equipped with an eye position tracking system which tracks real-time position of the eye's pupil.

5 Claims, 3 Drawing Sheets

MULTIFUNCTIONAL COLLIMATOR INDICATOR

BACKGROUND OF THE INVENTION

The present invention relates to devices providing visual indication of elapsed and ongoing values and parameters of a moving object such as speed, distance traveled, engine rotation, oil pressure, fuel reading, satellite navigational map readings as well as various warnings. The device is intended for usage on various types of automobiles and other vehicles including military transports used on the ground, air or water and require human interaction. The principal difference of the present invention is as follows:

- Vehicular data as mentioned above and that is formulated within driver's line of sight is displayed via collimated means.
- The shape, size and the color spectrum of the presented data is derived from the 2 primary direction positions of the driver's view: the dashboard or the outside environment.
- Display mode adjustments are fully automatic and are derived from the direction of the driver's view by tracking positioning of the eyeballs at any given moment.

The conception for the suggested multifunctional collimator indicator is necessitated by the need to augment safety measures as well as lower psychophysical strain levels relating to operating motor vehicles and other moving objects. For instance, operating an automobile at high speeds and/or under severe traffic conditions.

At this time, a number of high end models of selected car manufacturers such as Cadillac and BMW are equipped with some or all of the 3 types of gauges and indicators listed below:

- Traditional needle type or digital indicators mounted inside the dashboard behind the steering wheel.
- Navigation System display screen, usually mounted in the center of the dashboard on the symmetrical axis of a given vehicle.
- Heads-Up windshield indicators that are positioned above or "behind" the vehicle's dashboard and which on the background of an outside environment project into "infinity" graphical monochrome (commonly green or orange colored) display of selected critical parameters of a moving vehicle. The vertical optical axis of the indicator also passes through the axis of a steering wheel and is directed at a point located on the same level as the driver's eyes.

The gauges that are positioned inside the dashboard are standard and usually vary from one another only by design, color and sizes. Regardless of the vehicle's type and size, the distance between the driver's eyes and gauges is constant with only minimal variations dictated by driver's height and seat positioning.

The navigation system display is positioned on the vehicular axis of symmetry usually in the middle or upper portions of the dashboard. In order to obtain readings, this setup requires a head movement in the direction of the navigational display by the driver. While engaged in the activity of obtaining updated reading off the navigational display, the driver's ability to track the ever changing conditions of the outside environment is limited only to peripheral vision which severely handicaps one's judgment, especially in extreme conditions.

The quality of the display from the traditional gauges and the satellite navigational screens is greatly affected by the lighting factors of the external and internal environments. One of the most challenging conditions for obtaining quality readings pertains to convertible automobiles. In these autos, the quality of the reading acquisition process from vehicular gauges and navigational displays is directly subjected to the intensity of direct sunlight, causing hardship in obtaining quality and timely readings. The usage of sunshields on the gauges helps however does not serve as a solution to the problem.

The glance shifting of the eyes between the outside environment, vehicular gauges, and the satellite navigational map requires constant accommodations and readjustments of the eyes which subsequently dictates a certain delay. The significant valid differentiation factors in lighting conditions inside and outside of the vehicle causes further significant time delay in visual eye adjustments. The above stated factors subsequently influence the driver's overall state, judgment and reactions, by so causing decline in safety of the vehicle's operability, especially under severe conditions.

Thus, the combined presences of the 3 above stated independent visual sources of information, located in different places inside a vehicle varying in operation, functionality, design and that are intended to facilitate safe operability of a motor vehicle, in actuality worsen a number overall safety factors.

The conducted patent search has shown that devices closest to the present invention by structural design are disclosed in U.S. Pat. Nos. 5,497,271, 6,443,573 and 5,734,357, the last disclosing a method of tracking eyeball positioning.

A device disclosed in U.S. Pat. No. 5,497,271 stated above consists of an image formulator in place of a standardized dashboard, as well as a heads-up projection system used to display the generated image onto the windshield and consists of a semitransparent mirror and a lens. Depending on environmental conditions, the driver has the option to either visually follow the gauge readings directly from the image formulated in place of a standard dashboard with the help of a semitransparent mirror, or its optically generated equivalent which is reflected off the windshield of a vehicle and is projected onto the external environment "behind" the windshield.

A device disclosed in U.S. Pat. No. 6,443,573 is comprised of two image formulating channels, the low channel (direct line of sight) as well as the top channel (on the windshield), and each containing an independent visualizing element. The utilization of the low channel provides the driver with the ability to view the non-collimated data that is being reflected off a mirror. The top channel is equipped with a rotational dual positioned semi-reflective flat mirror as well as a secondary flat reflecting mirror with an adhesive Fresnel Lens. The implementation of the above listed components allows for a dual stage top channel image formulation. First stage is a short distance image display (via direct reflection off the mirror) and where the second stage is a long distance image display by utilizing collimation via means of the Fresnel Lens. The device disclosed in U.S. Pat. No. 5,734,357 is listed as a reference relating to a method of tracking driver's pupil movement.

The device as disclosed in U.S. Pat. No. 5,497,271 contains two conceptual shortcomings:

- With the mirror engaged and projecting onto the windshield, the displayed data is identical to that displayed on the dashboard. This places significant limits on size and shape of the projected data considering generally acceptable principles governing graphical data projection. For instance, the windshield projection of gauges and/or navigational map is not practical as the overabundance of images displayed onto the windshield can interfere with driver's awareness of the external environment which subsequently can contribute to a hazardous condition.

The usage of a semitransparent mirror providing the ability for visual tracking of data projected onto the windshield simultaneously with the identical image formulated on the dashboard significantly diminishes the brightness of both displays in turn negatively affecting the contrast of both displays, especially in highly illuminated external environments such as direct sunlight, tunnels and garages.

The device disclosed in U.S. Pat. No. 6,443,573 also consists of the following identified major shortcomings:

Image collimation only occurs on the top channel (the windshield) and only in a single position of the rotating semi-transparent mirror. The second position provides close distance image formulation with no collimation.

Introduction of a semi-transparent mirror in the optical system of the top channel causes decreased brightness levels in the non-collimated display mode by approximately two times while brightness levels in the collimated display mode are decreased approximately quadfold The low channel imaging is displayed via means of being reflected off a flat mirror with no collimation which effectively contradicts a set goal where all image formulation has to utilize collimated display.

The device disclosed in U.S. Pat. No. 5,734,357 utilizes and infrared system to track positioning of the driver's pupils in which the source of the infrared light is located on the dashboard, and where the receiving camera is built into the optical system of the indicator. The suggested system is once again unreasonably overcomplicated and possesses low sensitivity due to significant light loss while passing through the optical system of the device.

The disclosed multifunctional collimator indicator allows to fully mitigate and/or significantly minimize the above stated shortcomings with respect to safe operation of an automobile and others including but not limited to motor vehicles, vessels and aircrafts. Simultaneously, the invention presents the operator with an array of visual information such as:

Virtual display of standardized needle style gauges and/or other digital indicators.

Display of a navigational map inside the traditional dashboard located in front of the driver as opposed to midsection of the dashboard.

Display of relevant individual parameters of a moving vehicle on the windshield.

Display of warning and other mnemonic signals in place of a standard dashboard as well as projecting them onto a windshield.

SUMMARY OF THE INVENTION

The present multifunctional collimator indicator is placed inside a vehicle and is mounted in place of a traditional standard dashboard. Designed as a single unit, it consists of an image formulator and an optical collimator system with dual display channels. The lower channel displays virtual images of standardized needle type gauges and/or other types of informational indicators as well as a satellite navigational map. The upper channel projects graphical collimator images of selective readings critical to the safe operation of a vehicle onto the exterior environment of a windshield. Both channels provide the display of various warning and emergency signals that can be designated as mnemonic shapes.

To provide the ability to switch between the channels, a servo driven lightproof partition resembling a flat reflective mirror is used with one side turned towards the image formulator. In order to view the readings on the lower channel (direct line of sight), the partition is placed out of the lower channel's optical system. To view the readings on the upper channel (windshield), the partition is placed under a specified angle to the elements of the upper channel optical system and simultaneously obstructs the optical system of the lower channel.

Operating mode selection and channel switching is accomplished with a use of a control console. To provision automatic switching between lower and upper viewing channels, the indicator is enhanced with a visional tracking system used to identify the direction of the driver's view by following the position of the eye pupils.

Immediate angular field of view of the upper channel provides the ability to view the graphical display of all necessary parameters of a moving vehicle on an exterior environment of the windshield and with no head movements required by the driver. The immediate angular field of view of the lower channel is equivalent to the angular size of a standard traditional vehicular dashboard.

The disclosed collimator indicator is equipped with a CPU, the inlets of which are connected with corresponding sensors such as speed sensors, engine rotation sensors, oil sensors, navigation system e.t.c. The outlets of the indicator are connected with the inlets of the image formulator. The drawing of the desired virtual designs for gauges and background is accomplished with the use of computer programming at the time of production and can be easily changed at any time by reprogramming of the computer system.

BRIEF DESCRIPTION OF THE DRAWINGS

A detailed description of the present invention follows now with reference to accompanying drawings in which like elements are indicated by like reference letters and numerals.

DETAILED DESCRIPTION OF THE PREFERRED EMBODIMENT OF THE INVENTION

Figure 1:
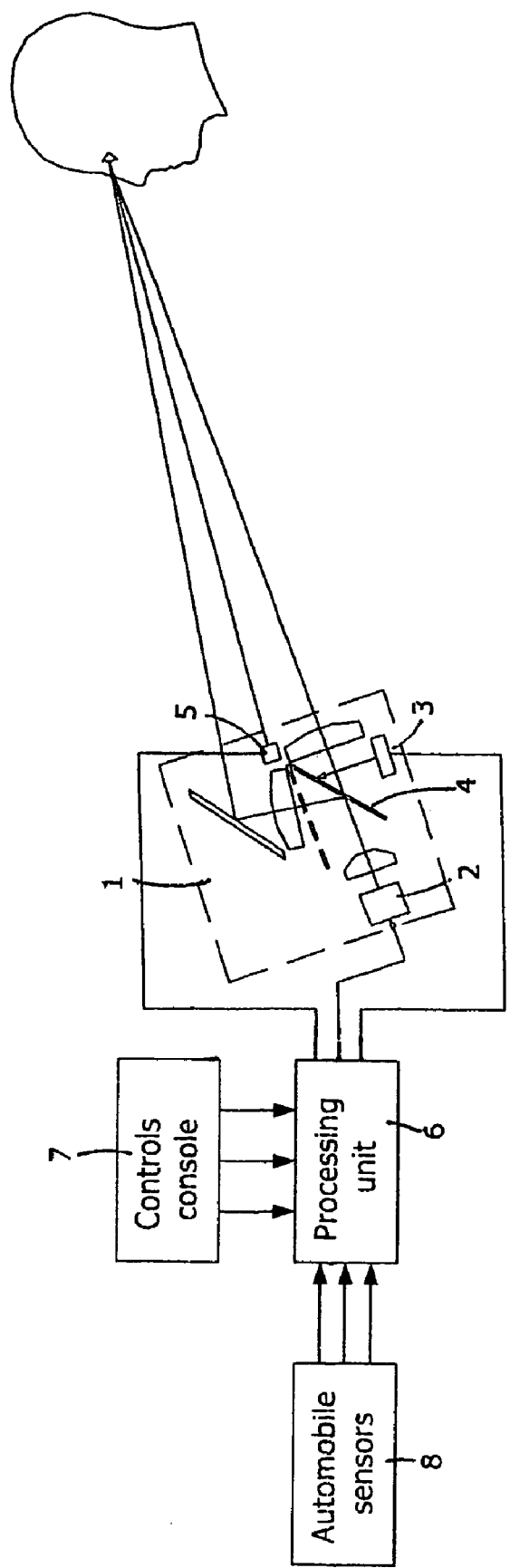
FIG. 1 shows a structural diagram of the vehicular multifunctional collimator indicator.

FIG. 1 shows a structural diagram of the vehicular multifunctional collimator indicator. It consists of the indication unit 1, which contains the image formulator 2, additional elements of the optical system, servo 3, rotating mirror 4, and the viewing direction sensor 5, the last being an integral part of the system responsible for determining the direction of the driver's view. The indicator also consists of a processing unit 6, and the controls console 7 that can be positioned nearby the indication unit or elsewhere as independently constructed modules. Some inlets of the processing unit 6 are connected with the automobile sensors 8, and other inlets of the processing unit 6 are connected with the controls console 7 and the viewing direction sensor 5. The outlets of the processing unit 6, are connected with the image formulator 2 and servo 3.

Figure 2:
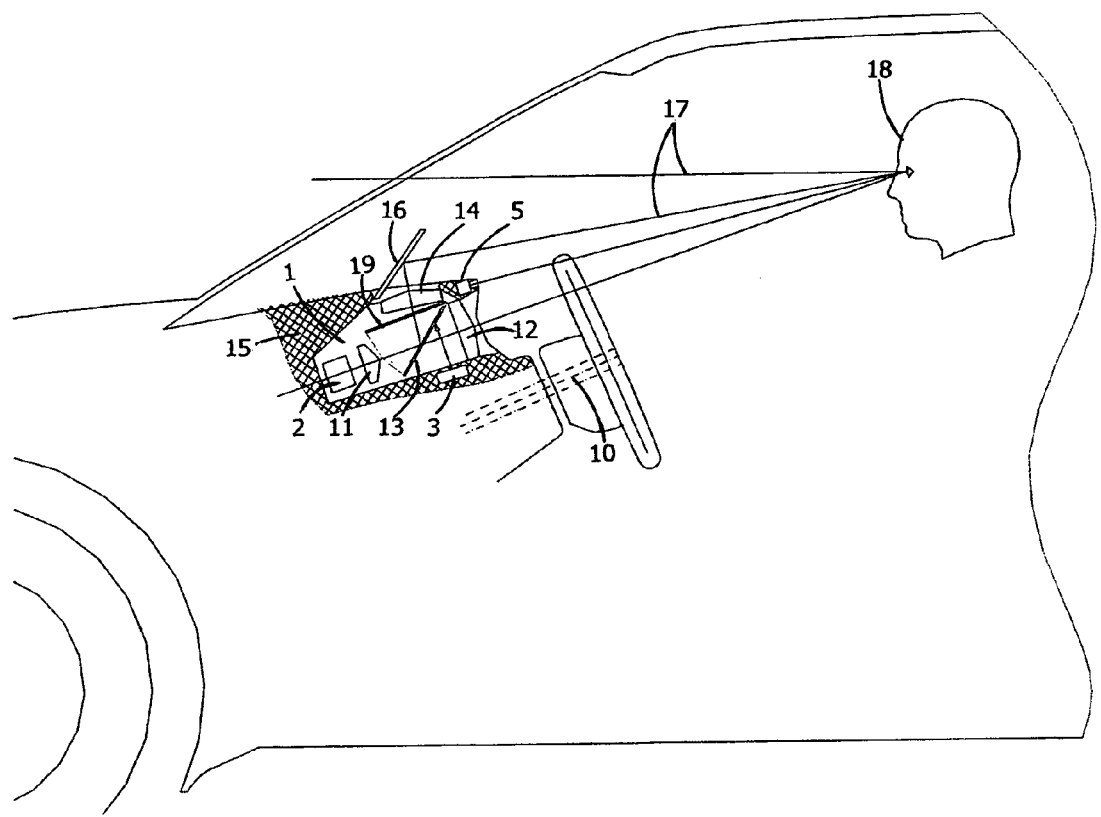
FIG. 2 shows a constructive diagram of the visual indication unit mounted inside an automobile in place of a standardized traditional dashboard.

FIG. 2 shows a constructive diagram of the indication unit 1, which is placed inside of a vehicle 9 in place of the traditional dashboard behind the steering column 10. The indication unit contains two channels for image formulation. The lower channel for direct view of the vehicular gauges, and the upper channel used to view the projected data on the exterior environment of the windshield. The lower channel consists of the image formulator 2, the entry lens component 11, and the exit lens component 12.

The upper channel also consists of the image formulator 2, and the entry lens component 11. It also consists of a flat reflecting rotating mirror placed into position 13, the exit lens component 14 mounted inside the decorative panel 15, and a semitransparent mirror 16 mounted on top of the exit lens component 14 inside the sector 17 of the driver's frontal view 18. The flat reflecting rotating mirror 4 has two fixed positions. With the upper channel engagement, the mirror is placed into position 13 and in addition to the last also serves as a lightproof partition for the lower channel by so obstructing the light rays emitted from the image formulator 2 and the entry lens component 11, to the exit lens component 12. With the lower channel engagement the flat reflecting rotating mirror is placed into position 19 and serves as a lightproof partition for the upper channel by so obstructing the light rays emitted from the image formulator 2 and the entry lens component 11, to the exit lens component 14 and semitransparent mirror 16. With this setup, the rotating mirror 4 provides individual visual tracking for data displayed by either channels. This configuration fully realizes the intensity of the light rays emitted by image formulator 2 which provides maximum attainable contrast for either channel by so providing the driver with high intensity displays under the brightest environmental conditions including direct sunlight and artificially lit tunnels and bridges.

To accommodate switching between the lower and the upper channels the mirror partition shifts from position 13 to position 19 with a use of a servo 3.

The channel selection can be accomplished with either the use of a remote control, voice activation, or a control console located in an ergonomically desired spot, for instance on the dashboard 15 on the right side of the steering column 10. The collimator indicator also supports automatic channel switching. To provide this functionality, the indicator can be enhanced with a visional tracking system used to identify the direction of the driver's view by following the position of the eye pupils. The viewing direction sensor 5 can be mounted inside the indication unit 1, between the exit lens components 12 and 14.

Figure 3:
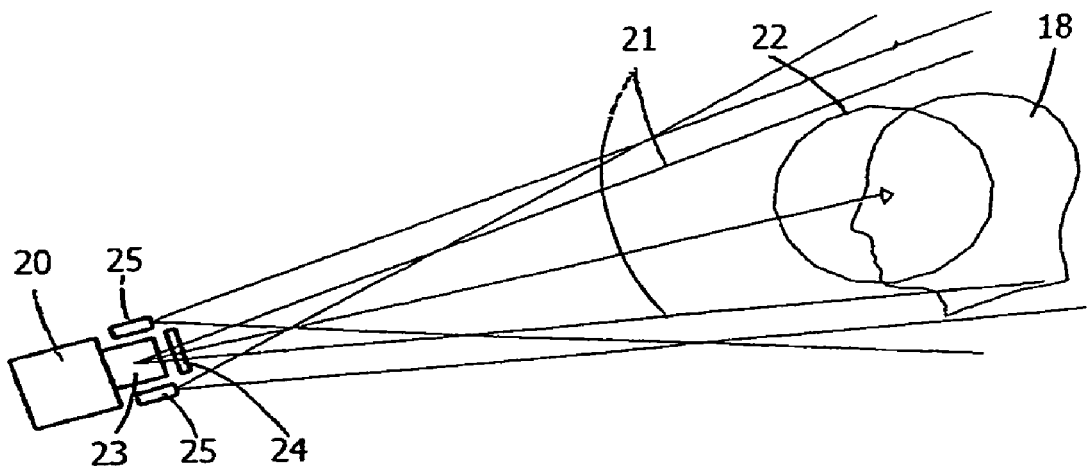
FIG. 3 shows one of possible constructive solutions of the sensor responsible for determining the direction of the driver's view.

FIG. 3 displays a way to implement the viewing direction sensor 5. This solution utilizes a miniature TV camera 20, the field of view 21 of which covers the range 22 of possible eye pupil's positions of the driver 18. The camera lens 23 is equipped with a specialized cover consisting of an infrared light filter 24, and a number of intense infrared light diodes 25. The infrared light diodes 25 illuminate the face and the eyes of the driver 18 while the infrared beams are reflected off the driver's eyes and are directed towards the TV camera 20 and passing through the infrared light filter 24 with the TV camera 20 being set to receive the infrared beams within a predefined range. The produced image from the viewing direction sensor 5 is then passed to processor 6 (refer to FIG. 1) for processing and calculating parameters of the exact direction of the driver's view as well as the corresponding position signal for servo 3, the last providing automatic placement of the rotating mirror 4 into correct position. To provide high sensitivity by eliminating loss due to infrared light as well as to ensure dependable operation, the pupil tracking system's TV Camera and the infrared light diodes are unified into a single compact device positioned on the dashboard of a vehicle. The implementation of infrared light diodes and a light filter allows the vision tracing system to be equally effective in complete darkness as well as intense lighting environments by filtering out the correct signal from the interfering light rays.

Figure 4:
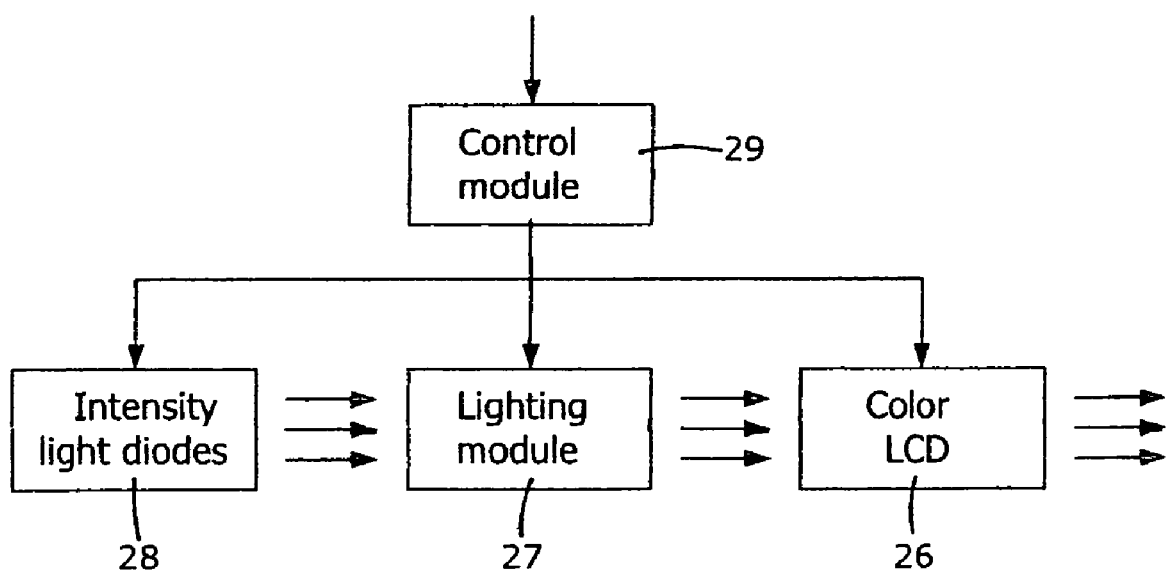
FIG. 4 shows the image formulator that is designed on the platform of a compact LCD panel.

The design of the image formulator 2, consists of a projector (FIG. 4) holding a high resolution miniature color LCD 26, lighting module 27 based on high intensity light diodes 28, and an electrical control module 29 which provides signaling required for the correct operation of the LCD 26 and the lighting module 27. The inlets of the control module 29 are connected with the processor 6 (FIG. 1), the last providing appropriate signaling to the projector derived from commands executed by the driver through controls console 7.

The indication unit utilizes an intense lighting optical system which projects the image from the LCD 26 towards the driver's view at a distance of approximately 3-5 meters which practically eliminates the constant process of driver's eye accommodation from the road to the dashboard and vice versa.

The parameters of the optical system provide the following:
  Visual tracking (on the upper channel) of graphical images projected onto the windshield of all critical parameters of a moving vehicle without any head movement by the driver.
  The angular visual field of view of the lower channel is equivalent to the angular size of a traditional gauge panel considering the general distance from the driver's eyes to the dashboard. In addition, to reduce the size and ease installation, the exit lens components 12 and 14 are designed as circles with cutouts to the upper and lower portions.
  To reduce the overall weight as well as manufacturing costs, the exit lens components 12 and 14 as well as the semitransparent mirror are made from organic glass such as acryl created by utilizing the method of pressurized molding. In addition, external acrylic elements are significantly less hazardous if broken, as they leave no sharp edges as opposed to silicate glass. To reduce the mass by so reducing the moment of inertia, the rotating mirror 4 is designed as a disk made from a lightweight metal such as aluminum or titanium. The side facing the image formulator is constructed as a flat reflecting mirror.

ADVANTAGES OF THE INVENTION

The disclosed multifunctional collimator indicator possesses a number of advantages when compared with the traditional modern ways of displaying relevant vehicular data on the standardized dashboards utilizing traditional gauges. The implementation of the disclosed invention significantly decreases a number of hazardous factors associated with operating a motor vehicle, as well as significantly lowers the driver's psychological and physiological strain loads.

The multifunctional collimator indicator allows to focus the driver's attention along the axis of vehicular movement and eliminates the need for constant head side shifts required to glance at various readings such as a navigational map, usually mounted to the right of the driver.

The utilization of the "well effect", assures the quality of the image displayed by the lower channel not being significantly influenced by the outside lighting conditions. This ensures high quality and contrast imaging formulated on the lower channel under the highest lighting conditions such as direct sunlight.

Because the reflective surface of the lightproof partition provides complete reflection of all light beams, the brightness of the images projected by the upper channel and "onto the windshield" significantly augments, which in turn results in improved contrast and confident comprehension of projected information by the driver under bright external environments.

To eliminate the need for eye accommodations between the external environments and vehicular gauges as well as to provide increased comfort and safety, the upper and lower channels utilize collimator optical systems for image projection by so resulting in bright and highly contrasting images projected into the "infinite distance."

The disclosed technical solutions including the optical system allow the construction of a compact indicator that can be mounted on the majority of modern and future automobiles and other vehicles requiring human operation.

The utilization of a built-in computer system allows remarkable flexibility in initial visual gauge design at the time of the manufacturing (for instance at a particular car maker's plant) as well as further adjustments and considerations for the required ergonomic standards.

We claim:

1. Multifunctional collimator indicator positioned inside vehicular cabin in place of a standardized dashboard and comprising of: an LCD based image formulator, dual channel displays whereas the upper channel is projecting a collimated monochromatic image of the ongoing critical vehicular parameters onto the dashboard and into the optical infinity, and whereas the lower channel is formulating virtual color imaging of a standardized needle and digitized gauges as well as a computer and a visional tracking system to identify the direction of the driver's view by following the position of the eye pupils and which is further distinguished by:

whereas to provide increased levels in safety of operating a motor vehicle by eliminating the timing which is otherwise required for driver's eye accommodation from the outside environment onto the lower channel formulating imaging of the standardized dashboard, the lower channel displays information in a collimated format;

whereas to provide the ability to alternate visual tracking of images provided by both channels as a result of alternation in direction of the driver's view as well as to minimize light losses, an optical system is equipped with a shifting optical element which supports complete reflection of monochromatic green light during operation of the upper channel, and which further supports complete visible light spectrum transparency during operation of the lower channel.

2. Multifunctional collimator indicator as in claim 1, distinguished by whereas to provide collimated imaging by the lower channel, the lower channel display is equipped with the optical system and whereas to further support favorable visual comprehension of the virtual images of the vehicular gauges by the driver equivalent to the comprehension of ongoing reading of the standardized dashboard gauge, the angular displacement of the lower channel collimating system is equivalent to the angular displacement of the traditional standardized dashboard the distance to which is measured from the positional origin of the driver's eyes.

3. Multifunctional collimator indicator as in claim 2, distinguished by whereas to minimize the device's dimensions to best be positioned within frontal limits of the vehicular dashboard, the egress lenses of the lower channel collimating optical system are designed in circular form without cutouts to the upper and lower portions.

4. Multifunctional collimator indicator as in claim 2, distinguished by whereas the optical element providing alternation in visual tracking of the graphical data of the upper and lower channels is designed as a swinging fully reflective mirror where during image visualization of the upper channel projected onto the windshield, the reflecting surface of the optical element turned toward the image formulator is positioned at such angle where the optical axis of the image formulator and the upper channel's collimating system intersect at a single point on the reflective surface, while during image visualization of the lower channel, the optical element is moved out of the lower channel's field of view by so simultaneously covering the upper optical channel.

5. Multifunctional collimator indicator as in claim 4, distinguished by whereas to automate the positioning of the swing optical element into any one of the two fixed positions that are derived from the direction of the driver's sight, the element is equipped with an automatic drive which places the optical element into a desired position in conformance with a command signal originating from the driver's pupil tracking system.

* * * * *